(12) United States Patent
Klees

(10) Patent No.: US 7,545,620 B2
(45) Date of Patent: Jun. 9, 2009

(54) ACCESS PROTECTION DEVICE FOR A PROHIBITED AREA

(75) Inventor: Christoph Klees, Köln (DE)

(73) Assignee: K.A. Schmersal Holding KG, Wuppertal (DE)

( * ) Notice: Subject to any disclaimer, the term of this patent is extended or adjusted under 35 U.S.C. 154(b) by 508 days.

(21) Appl. No.: 10/911,140

(22) Filed: Aug. 3, 2004

(65) Prior Publication Data

US 2005/0047054 A1 Mar. 3, 2005

(30) Foreign Application Priority Data

Aug. 27, 2003 (DE) .................. 103 39 363

(51) Int. Cl.
*H01H 47/00* (2006.01)
(52) U.S. Cl. .................... 361/172
(58) Field of Classification Search ................. 361/172; 70/277; 324/207.24
See application file for complete search history.

(56) References Cited

U.S. PATENT DOCUMENTS

| | | | | |
|---|---|---|---|---|
| 4,843,259 A | * | 6/1989 | Weisshaupt | 327/510 |
| 5,166,729 A | * | 11/1992 | Rathbun et al. | 399/63 |
| 5,184,855 A | * | 2/1993 | Waltz et al. | 292/251.5 |
| 5,198,764 A | * | 3/1993 | Spencer | 324/207.26 |
| 6,271,751 B1 | * | 8/2001 | Hunt et al. | 340/514 |
| 6,335,600 B1 | * | 1/2002 | Kasai et al. | 318/434 |
| 2003/0052489 A1 | * | 3/2003 | Schwesig | 292/144 |

FOREIGN PATENT DOCUMENTS

| | | |
|---|---|---|
| DE | 19910497 | 9/2000 |
| DE | 19910497 A1 | 9/2000 |
| DE | 20306708 | 7/2003 |
| DE | 20306708 U1 | 8/2003 |
| DE | 19953898 C5 | 7/2004 |
| EP | 0908904 A | 4/1999 |

* cited by examiner

*Primary Examiner*—Stephen W Jackson
*Assistant Examiner*—Scott Bauer
(74) *Attorney, Agent, or Firm*—Townsend and Townsend and Crew LLP

(57) ABSTRACT

The invention relates to an access protection device for a physical area which can be switched on and off in a controlled manner, comprising a fixed part, at least one movable part for closing an access opening in the fixed part and, for each movable part, a tumbler device having a magnetic circuit, which comprises a magnetizable yoke located on the movable part and an electromagnet which can be closed by means of the yoke, it being possible to regulate the locking force of said electromagnet by means of a current regulator, a first and a second desired value being predetermined for the current regulator, and it being possible to periodically carry out a controlled jump from the first to the second desired value, it being possible to measure the time from the beginning of the controlled jump to the time at which the second desired value is reached.

14 Claims, 2 Drawing Sheets

ACCESS PROTECTION DEVICE FOR A PROHIBITED AREA

FIELD OF THE INVENTION

The invention relates to an access protection device for a physical area as for a prohibited area wherein a machinery, for instance a robot, is arranged which when operating could cause a danger for working people in the environment of the machinery.

DESCRIPTION OF THE RELATED ART

An access protection device having a tumbler which comprises a magnetic circuit is known, for example, from German Utility Model DE 203 06 708 U1. According to this known device, a magnetic field sensor is provided adjacent to a contact face between the magnet and its yoke for the purpose of detecting the magnetic field outside the magnetic circuit. The locking force of the electromagnet is in this case determined by the current flowing through the electromagnet, and this current is correspondingly regulated. However, the provision of a separate magnetic field sensor for the purpose of monitoring the state of the tumbler is complex.

SUMMARY OF THE INVENTION

An object of the invention is to provide an access protection device which functions without a separate sensor.

It is a further object of the invention to provide a tumbler device for an access protection device so that it functions without a separate sensor.

The invention concerns an access protection device for a physical area, said device being switchable on and off in a controlled manner and comprising:

a fixed part with at least one access opening; a movable part for each of the access opening for closing them;

a tumbler device for each movable part; wherein said tumbler device comprises a magnetic circuit with a magnetizable yoke located on the movable part and an electromagnet which is closable by means of the yoke;

and a current regulator for regulating the locking force of said electromagnet;

wherein a first and a second value are preset for the current regulator, said current regulator periodically carrying out a controlled jump from the first to the second set value and measuring the time from the beginning of the controlled jump to the time at which the second set value is reached to determine whether the tumbler device provides an intended locking force.

Thus, in the case of the present invention provision is made for a first and a second value to be set for the current regulator, and for it to be possible to periodically carry out a controlled jump from the first to the second set value, it being possible to measure the time from the beginning of the controlled jump to the time at which the second set value is reached. In this manner it is possible to use the change in the inductance in the coil of the electromagnet to determine whether the tumbler device provides the intended locking force, i.e. whether the tumbler device is closed, or whether the intended locking force has not been provided, i.e. the tumbler device is open, since the time which is required from the beginning of the controlled jump to the time at which the second set value is reached depends on whether the magnetic circuit is closed by means of the yoke or not. The further removed the joke is from the electromagnet, the longer this period of time is.

The invention further concerns a tumbler device comprising:

an electromagnet with a coil provided with a core, which form together with a yoke a magnetic circuit which is closable by means of the yoke;

a current regulator for regulating the locking force of said electromagnet;

wherein a first and a second value are preset for the current regulator, said current regulator periodically carrying out a controlled jump from the first to the second set value and measuring the time from the beginning of the controlled jump to the time at which the second set value is reached to determine whether the tumbler device provides an intended locking force.

Further objects, advantages and modifications of the invention can be gathered from the following description and the claims.

The invention is now explained in more detail hereinbelow with reference to an exemplary embodiment illustrated in the attached drawings.

DESCRIPTION OF A PREFERRED EMBODIMENT

Figure 1:
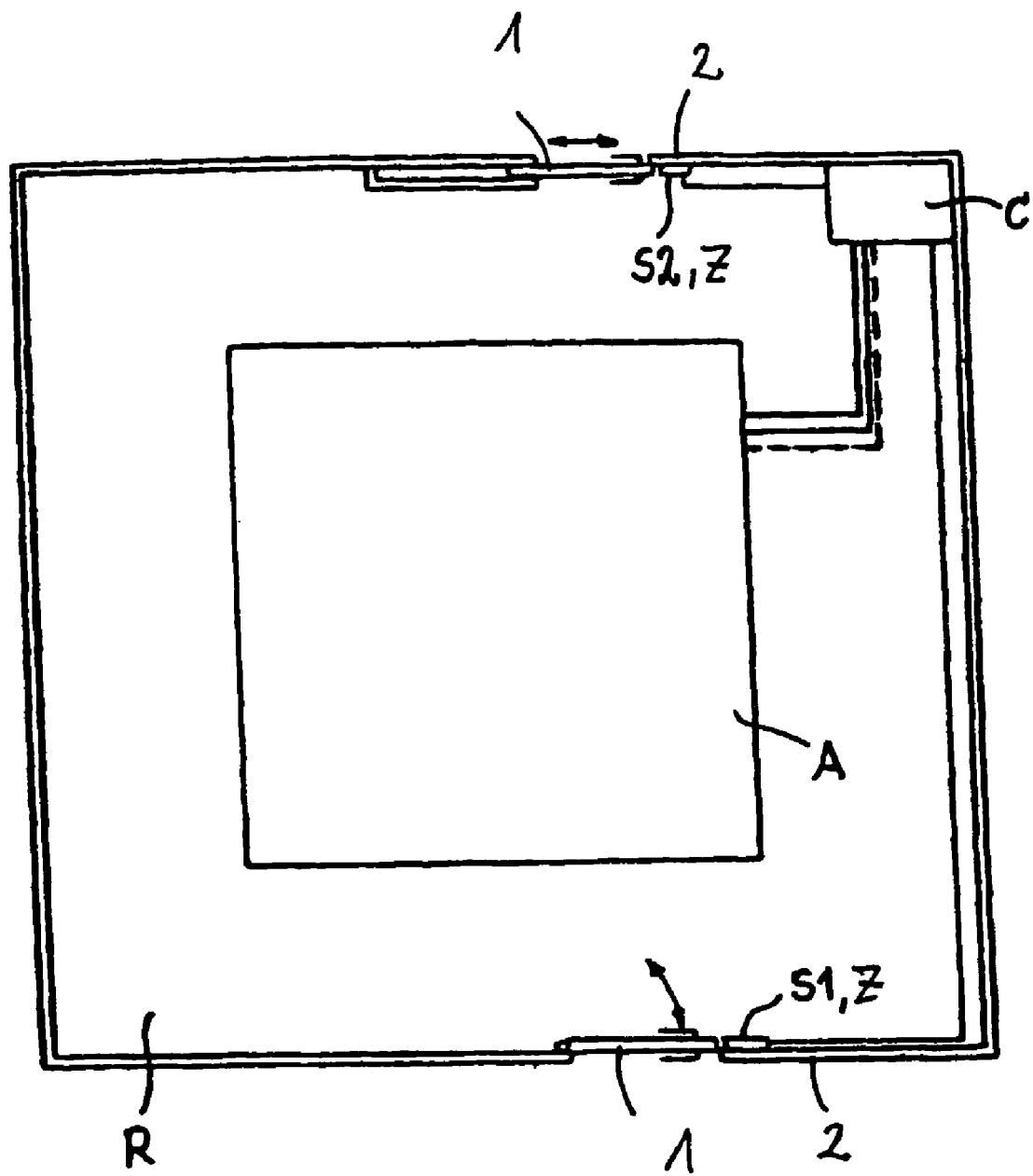
FIG. 1 shows schematically an access protection device of the invention.
Figure 2:
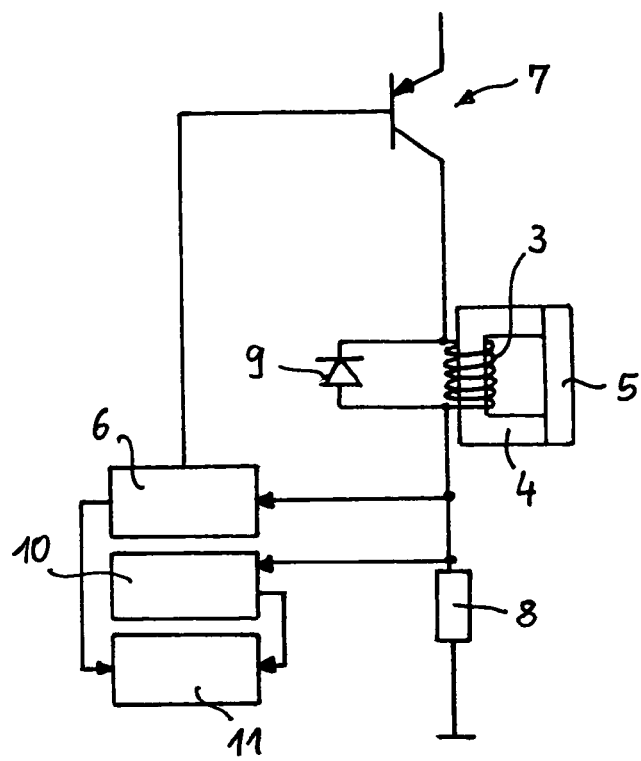
FIG. 2 shows schematically a tumbler device for the access protection device of the invention.

FIG. 1 shows an access protection device of the invention for a physical or prohibited area R, which can be accessed and can be closed, of a machine installation A (understood here to mean, for example, machines or components for production, treatment or processing purposes as well as installations comprising said machines or components and possibly also chemical installations or the like). The physical area R is accessible via two or more doors 1 as movable parts with respect to the fixed walls 2 as the fixed part. The doors 1 which may be sealed off around the periphery may be opened or closed by pivoting or pushing. In each case one safety sensor S1, S2 and a tumbler device Z for the door 1 are located between the doors 1 and an adjacent wall 2. In addition, a controller C is provided which is coupled to the machine installation A and the safety sensors S1, S2 in order to release or lock the tumbler devices Z depending on the operating state of the machine installation A for the purpose of opening the doors 1. If a signal is emitted to the controller C indicating that the movable parts of the machine installation A are at a standstill, for example by means of a zero-speed monitor (not shown), the tumbler devices Z are released with the result that the physical area R is made accessible by opening the doors 1. If at least parts of the machine installation A are not at a standstill or if precautions which should otherwise be carried out are not taken before the doors 1 are opened, the tumbler devices Z are blocked, with the result that the doors 1 cannot be opened. In addition, the controller C prevents the machine installation A from starting operation when at least one door 1 is open.

The respective tumbler device Z comprises an electromagnet having a coil 3 and an essentially U-shaped core 4, it being possible to close the magnetic circuit formed by means of a yoke 5 fixed to the door 1.

The current flowing through the coil 3 and thus the locking force of the tumbler device Z is held at an essentially constant, first value by means of a current regulator 6. By means of the current regulator 6, a transistor 7 is driven by means of which a correspondingly regulated current flows through the coil 3 and, via a shunt resistor 8, to earth. Connected in parallel with the coil 3 is a diode 9 whose function consists in maintaining the current through the coil 3 when the transistor 7 switches off.

The voltage across the shunt resistor 8 is a measure of the current flowing through the coil 3. This voltage is represented by means of an analogue-to-digital converter 10.

The current regulator 6 is periodically, i.e. after predetermined time intervals, switched over to a second value by means of a switching signal produced, for example, by the controller C. This second set value is preferably higher than the first set value in order for the locking force not to be reduced by the switch-over. The switching signal causes a counter 11 to start. The switch-over for increasing (or decreasing) the set value brings about, as a result of the change in inductance in the coil 3 and in accordance with an exponential function, a delay in the time taken to reach the second set value, the period of time taken for the current flowing through the coil 3 to reach the second set value being dependent on how far away the yoke 5 is from the core 4 of the coil 3 and closes the magnetic circuit. When the second set value is reached, the instantaneous counter reading of the counter 11 is evaluated in order to determine and thus to monitor whether the magnetic circuit and thus the tumbler device Z is closed with the predetermined locking force or else is open, i.e. the predetermined locking force is not achieved.

When the second set value is reached, it is correspondingly possible to periodically switch back to the first set value with or without correspondingly monitoring the locking force.

Figure 3:
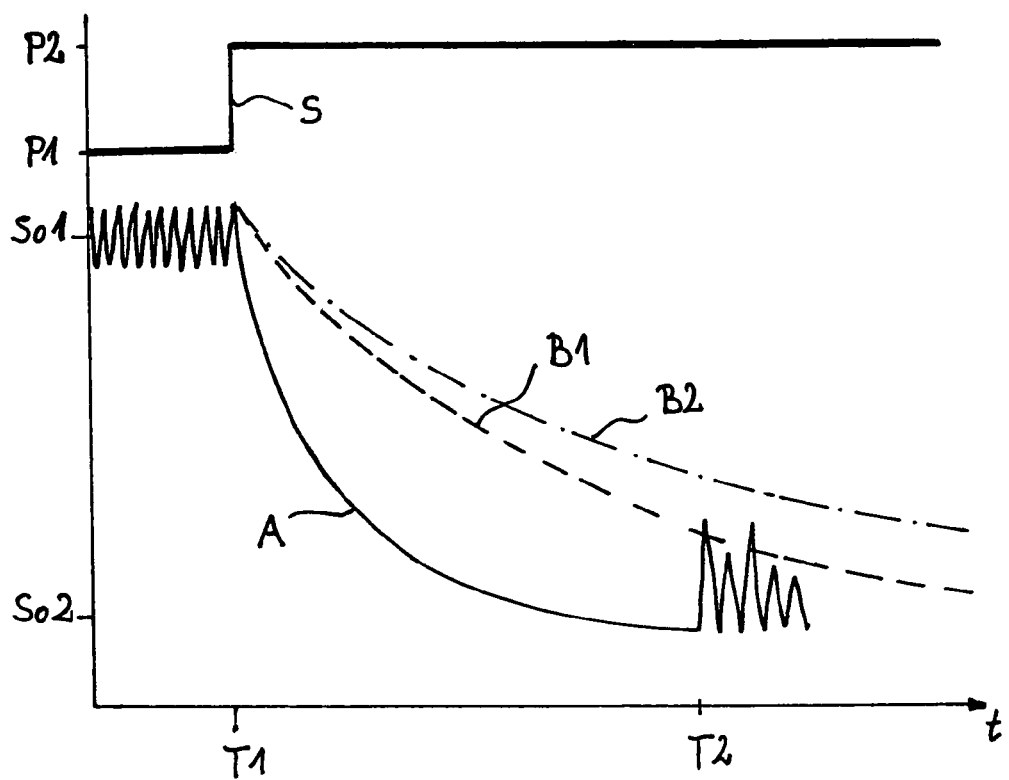
FIG. 3 shows a diagram relating to the switching behavior in the event of a controlled jump.

As is shown in FIG. 3, first of all a level P1 of a control signal for the current regulator 6 causes the current through the coil 3 to be regulated such that it is at the first set value So1. At a point in time T1, a jump S to a level P2 takes place, by means of which a controlled jump to the second set value So2 is brought about. The jump S is at the same time a trigger signal for the counter 11.

The resultant change in the inductance in the coil 3 means that the set value So2 is reached only after a time delay. When the magnetic circuit is closed by the yoke 5, the second set value So2 is reached relatively rapidly (depending on the electromagnet and the temperature) corresponding to the curved piece A after a period of time T2 which may be, for example, of the order of magnitude of approximately 1 ms. If there is a gap between the core 4 and the yoke 5, the value So2 is reached only later corresponding to the curved piece B1, B2 . . . , the period of time being dependent on the distance between the yoke and the core 4. When, for example, a sheet of paper having a thickness of 100 _m is located between the two, there is (likewise depending on the electromagnet and the temperature) already a considerably greater time difference which in the above example of 1 ms is greater by approximately 2 ms in comparison with the closed magnetic circuit.

The periodicity in relation to the controlled jump may be, for example, in the range from 10 to 100 ms or else below and above this range.

The current regulator 6, the analogue-to-digital converter 10 and the counter 11 as well as the evaluation may be represented by a microprocessor.

Although the foregoing has been a description of a preferred embodiment of the invention, it will be apparent to those skilled in the art that numerous variations and modifications may be made in the invention without departing from the scope as described herein.

I claim:

1. An access protection device for a physical area, said device comprising:
   a fixed part with at least one access opening; a movable part for each of the access opening for closing them;
   a tumbler device for each movable part; wherein said tumbler device comprises a magnetic circuit with a magnetizable yoke located on the movable part and an electromagnet which is closable by means of the yoke;
   a controller comprising a current regulator for regulating the locking force of said electromagnet, the controller also operably connected to a machine within the physical area; and
   a sensor that informs the controller of an operating state of the machine;
   wherein a first and a second value are preset for the current regulator, said current regulator periodically carrying out a controlled jump from the first to the second set value and measuring the time from the beginning of the controlled jump to the time at which the second set value is reached to determine whether the tumbler device provides an intended locking force and to determine whether the magnetic circuit is closed by the yoke;
   and wherein the controller is configured to control the locking force and the operation of the machine based on the information from the sensor and on whether the magnetic circuit is closed by the yoke;
   and wherein the time from the beginning of the controlled jump to the time at which the second set value is reached is at its minimum when the magnetic circuit is closed by the yoke.

2. The device according to claim 1, wherein the current flowing through the electromagnet is measurable using the voltage across an associated shunt resistor.

3. The device according to claim 1, wherein a counter is triggerable by means of the controlled jump, the counter reading of said counter being evaluated when the second set value is reached.

4. The device according to claim 1, wherein the current regulator, the time measurement and evaluation are implemented in a microprocessor.

5. The device according to claim 1, wherein the first and second values are both different from zero.

6. The system of claim 1, wherein the controller is further configured to provide a locking force when the sensor indicates the machine is operating, and to release the locking force when the sensor indicates that movable parts of the machine are at a standstill.

7. The system of claim 1, wherein the magnetic circuit is closed when a door is closed, and wherein the controller is further configured to prevent startup of the machine when the door is open.

8. A tumbler device comprising:
   an electromagnet with a coil provided with a core, which form together with a yoke a magnetic circuit which is closable by means of the yoke;
   a current regulator for regulating the locking force of said electromagnet;
   wherein a first and a second value are preset for the current regulator, said current regulator periodically carrying out a controlled jump from the first to the second set value and measuring the time from the beginning of the controlled jump to the time at which the second set value is reached to determine whether the tumbler device provides an intended locking force;

and wherein the time from the beginning of the controlled jump to the time at which the second set value is reached is at its minimum when the magnetic circuit is closed by the yoke.

9. The tumbler device according to claim 8, wherein the current flowing through the electromagnet can be measured using the voltage across an associated shunt resistor.

10. The tumbler device according to claim 8, wherein a counter is triggerable by means of the controlled jump, the counter reading of said counter being evaluated when the second set value is reached.

11. The tumbler device according to claim 8, wherein the current regulator, the time measurement and evaluation are implemented in a microprocessor.

12. The tumbler device according to claim 8, wherein the first and second values are used to provide the locking force as well as to monitor the respective locking force.

13. The tumbler device according to claim 8, wherein the first and second values are both different from zero.

14. An access protection device for a physical area, said device being switchable on and off in a controlled manner and comprising:

a fixed part with at least one access opening; a movable part for each of the access opening for closing them;

a tumbler device for each movable part; wherein said tumbler device comprises a magnetic circuit with a magnetizable yoke located on the movable part and an electromagnet which is closable by means of the yoke; and a current regulator for regulating the locking force of said electromagnet;

wherein a first and a second value are preset for the current regulator, said current regulator periodically carrying out a controlled jump from the first to the second set value and measuring the time from the beginning of the controlled jump to the time at which the second set value is reached to determine whether the tumbler device provides an intended locking force and to determine a distance between the moveable part and the electromagnet;

and wherein the time from the beginning of the controlled jump to the time at which the second set value is reached is at its minimum when the movable part and the electromagnet are in contact with each other.

* * * * *